Sept. 9, 1924.  
C. E. ANDERSON  
AGRICULTURAL IMPLEMENT  
Filed April 14, 1923  
1,507,982

Inventor  
CHARLES E. ANDERSON.

By Watson E. Coleman,  
Attorney

Patented Sept. 9, 1924.

1,507,982

UNITED STATES PATENT OFFICE.

CHARLES E. ANDERSON, OF DEVILS LAKE, NORTH DAKOTA.

AGRICULTURAL IMPLEMENT.

Application filed April 14, 1923. Serial No. 632,092.

*To all whom it may concern:*

Be it known that I, CHARLES E. ANDERSON, a citizen of the United States, residing at Devils Lake, in the county of Ramsey and State of North Dakota, have invented certain new and useful Improvements in Agricultural Implements, of which the following is a specification, reference being had to the accompanying drawings.

This invention relates to certain improvements in agricultural implements and has relation more particularly to a device of this general character of a garden type and which is adapted to be manually impelled and it is an object of the invention to provide a device of this general character with novel and improved means whereby the body of the operator may be employed to facilitate the traverse of the implement.

The invention consists in the details of construction and in the combination and arrangement of the several parts of my improved agricultural implement whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

As disclosed in the accompanying drawings, 1 denotes an arcuate member having its extremities secured to the end portions of an axle 2. Mounted upon the axle 2 between the extremities of the member 1 is a ground engaging wheel 3. The hub 4 of said wheel being of a length to substantially bridge the space between the extremities of said member 1.

Figure 1:
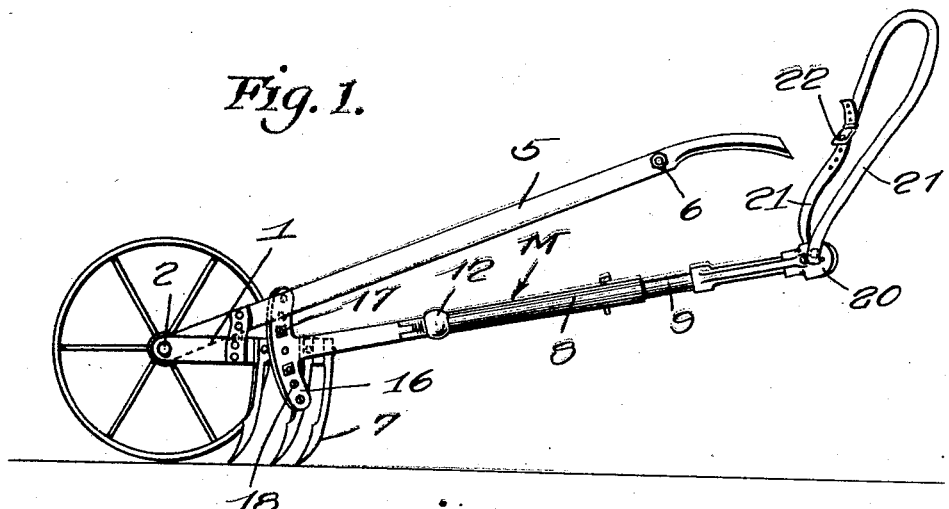
Figure 1 is a view in side elevation of an agricultural implement constructed in accordance with an embodiment of my invention.
Figure 2:
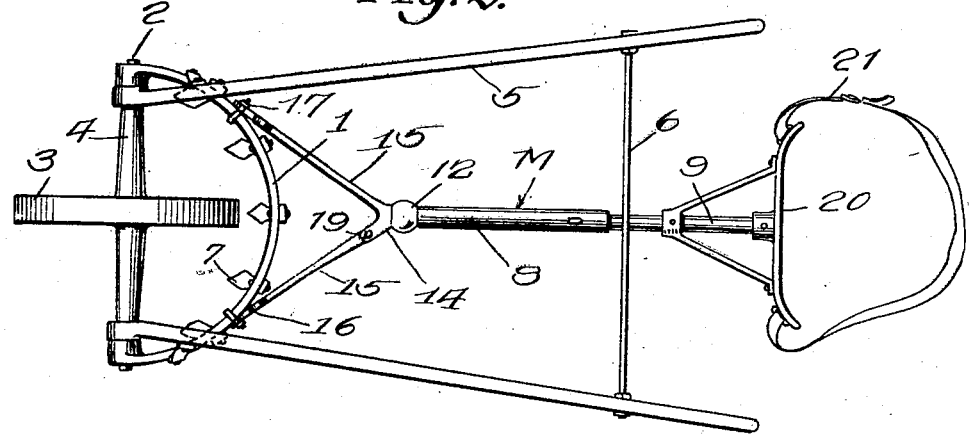
Figure 2 is a view in top plan of the structure as illustrated in Figure 1.
Figure 3:
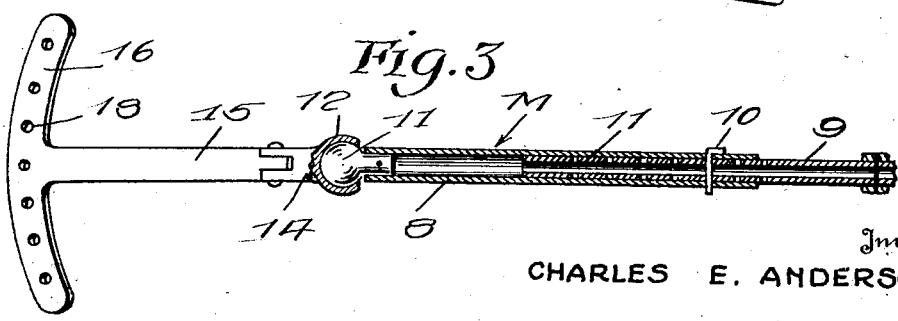
Figure 3 is an enlarged fragmentary view partly in elevation and partly in section of the member for direct engagement with the body of the operator.

5 denotes handle members having their forward extremities engaged with the axle 2 between the ends of the hub 4 and the extremities of the member 1 as clearly illustrated in Figure 1. The upper or outer end portions of the handle members 5 are connected by the cross or tie rod 6.

Operatively engaged with the member 1 are the ground working members 7 of any desired type and of a character generally employed in connection with agricultural implements for garden use.

M denotes in its entirety a body engaging member to facilitate the travel of the implement and as herein disclosed said member denotes a pair of telescopically engaged elongated members 8 and 9. The members 8 and 9 are adjustable one relative to the other as the necessities of practice may require and such adjustment is maintained by a pin 10 or the like disposed through the member 9 and selectively through a series of longitudinally spaced openings 11 carried by the inner or insertible member 9. The outer end portion of the member 8 is provided with a ball 11' engaged within a socket 12 carried by a head 14.

Diverging from the head 14 are the arms 15 each terminating in a cross head 16. The cross heads 16 of the arms 15 are adapted to have contact with the member 1 from the rear and each of said heads is held in applied position by a clamp 17. The clamp 17 is of a conventional U-type and the side members thereof are insertible through the spaced openings 18 provided in each of the heads 16. The clamp member when applied straddles the member 1. I also find it of advantage to have one of the arms 15 hingedly or pivotally connected as at 19 with the head 14 so that the arms 15 may be spread or separated in accordance with the size of the implement with which the body engaging member is to be applied.

The outer end portion of the member 9 is provided with a cross member or yoke 20 for direct contact with the body of the operator so that in practice push may be imposed upon the implement direct from the body whereby the requisite travel of the implement is materially facilitated. Engaged with the extremities of the yoke or member 20 are the straps 21 or the like which when connected provide a loop engageable around the neck of the operator whereby the member or yoke 20 is maintained in desired position with respect to the body. The straps 21 are adjustably connected as at 22 in order that the loop may be adjusted as required.

By providing the ball and socket joint the telescoping members 8 and 9 are permitted to have movement independently of the head 14 so that during a working operation compensation will be made for the lateral movement of the operator relative to the agricultural implement whereby rubbing or other resulting discomfort to the operator is materially reduced.

From the foregoing description it is thought to be obvious that an agricultural implement constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with an agricultural implement of the walking type, a push element associated therewith comprising an elongated member, a body engaging yoke carried by the outer end of the member, a head, an articulated connection between the head and the elongated member, diverging arms carried by the head, one of said arms having swinging movement relative to the other, and means associated with the outer end portions of each of the arms for connecting the same to the implement.

2. In combination with an agricultural implement of the walking type, a push element associated therewith comprising an elongated member, a body engaging yoke carried by the outer end of the member, a head, an articulated connection between the head and the elongated member, diverging arms carried by the head, one of said arms having swinging movement relative to the other, a cross head carried by the outer extremities of each of the arms, and means for adjustably connecting each of the cross heads with the implement.

In testimony whereof I hereunto affix my signature.

CHARLES E. ANDERSON.